United States Patent

[11] 3,566,177

[72] Inventor Daniel A. Larson
 Cedar Grove, N.J.
[21] Appl. No. 740,180
[22] Filed June 26, 1968
[45] Patented Feb. 23, 1971
[73] Assignee Westinghouse Electric Corporation
 Pittsburgh, Pa.

[54] MERCURY-ALKALI METAL DISCHARGE DEVICES
 4 Claims, 4 Drawing Figs.

[52] U.S. Cl. .................................................. 313/184,
 313/229, 331/94.5
[51] Int. Cl. .....................................................H01j 17/20,
 H01s 3/09
[50] Field of Search........................................... 313/184,
 229; 331/94.5, (Inquired)

[56] References Cited
 UNITED STATES PATENTS
3,234,421 2/1966 Reiling .......................... 313/225X
3,248,590 4/1966 Schmidt ........................ 313/184
3,252,103 5/1966 Geusic et al. .................. 331/94.5X
3,317,778 5/1967 Timmermans et al. ....... 313/229X
3,384,798 5/1968 Schmidt ........................ 313/184
 OTHER REFERENCES
 Electronics, Vol. 40, No. 19, September 18, 1967, Article Entitled " Righter Light," pages 44, 45. (copy in 313— 229 Lit.)

Primary Examiner—Robert Segal
Assistant Examiner—Palmer C. Demeo
Attorneys—A. T. Stratton, W. D. Palmer and D. S. Buleza ABSTRACT: An arc-discharge device for efficiently producing radiation in selected portions of the spectrum. The device contains a discharge sustaining filling of inert gas, mercury, and sodium or potassium. The ratios of the materials and the operational mode are such that the resonance lines of the sodium and potassium are self-reversed and the radiation is broadened as a continuum in the portions of the spectrum adjacent the respective resonance lines. These devices can be advantageously used to optically pump neodymium-doped yttrium-aluminum-garnet laser material, which strongly absorbs radiation in the portions of the spectrum in which these devices generate radiation.

INVENTOR
Daniel A. Larson
BY W.D. Palmer
ATTORNEY

MERCURY-ALKALI METAL DISCHARGE DEVICES

BACKGROUND OF THE INVENTION

Alkali metal arc-discharge devices are well known in the art. Devices utilizing alkali metal iodides as constituents are well known. Such lamps have been designed and operated to provide maximum visible efficiency. It is also well known that in an alkali metal discharge device operated at high reactive metal pressure, the resonance radiation of the particular alkali metal is self-reversed, and much of the radiative output is shifted to the long-wavelength wing adjacent the respective resonance line.

Optical pumping of a laser system is now well known in the art. A lasering material is taught by Geusic et al. in U.S. Pat. No. 3,252,103 issued May 17, 1966, which has a very good absorption characteristic for radiation in the ranges from 5650 to 6000 angstroms, 7300 to 7600 angstroms, and 7900 to 8200 angstroms. This material is neodymium-doped yttrium-aluminum-garnet (YAG) which is typically formed as a rod for use in a laser system. Various radiative sources such as quartz-iodine incandescent lamps have been used in the past for pumping such material. An arc-discharge device producing a tailored radiative output for pumping such laser material is described in copending application 629,781 filed Apr. 10, 1967 and owned by the present assignee. In the foregoing device the sodium resonance lines at 5890—5896 A. were accentuated to pump the YAG material.

SUMMARY OF THE INVENTION

It is accordingly an object of this invention to provide an efficient source of radiation in preselected portions of the spectrum.

It is another object of the invention to provide an efficient source of radiation for optically pumping a lasering material which is highly absorptive of the radiation produced.

It is more particularly an object of the invention to provide an efficient source of radiation for optically pumping neodymium-doped yttrium-aluminum-garnet lasering material which has a good radiation absorption characteristic in the range of 7300 to 7600 angstroms, and 7900 to 8200 angstroms.

The aforementioned objects and others which will become apparent as the description proceeds are achieved by providing an arc-discharge device containing a discharge-sustaining filling consisting essentially of a small charge of inert gas, mercury, and sodium or potassium. The sodium or potassium is present in an amount of at least $1 \times 10^{-5}$ gram per cc of envelope volume and the gram-atom ratio of mercury to sodium or potassium is from 0.1 to 5. The arc-discharge devices are constructed and operated at a power level such that when sodium is included the partial pressure of sodium is from 400 torrs to 3 atmospheres, and for potassium is from 10 torrs to 200 torrs. The radiative output of such devices is thus determined so that the sodium and potassium resonance lines are self-reversed and the radiation is substantially a continuum in the portions of the spectrum extending from the respective resonance lines. These devices are readily optically coupled by conventional means to neodymium-doped yttrium-aluminum-garnet laser material to provide an efficient laser system.

DESCRIPTION OF THE PREFERRED EMBODIMENT

Figure 1:
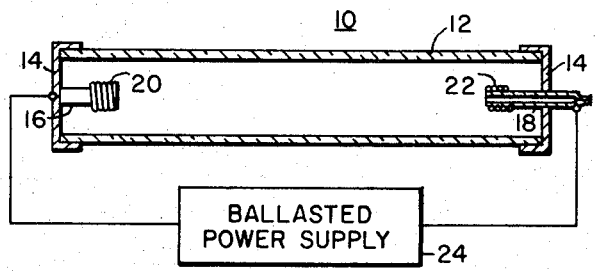
FIG. 1 is a view in elevation of the arc-discharge device of the present invention.

In FIG. 1, the light-transmissive arc-tube 10 is constructed with a tubular envelope 12 of a high temperature resistant, nonreactive material, such as sapphire or polycrystalline alumina. The envelope 12 is hermetically sealed at each end by end caps 14, which are typically niobium. The lead-in conductors 16, 18 are tubular members, of for example tantalum. At least one of the tubular members, and here member 18 is brought through the end cap 14 to allow exhausting for dosing of the device after which the tubulation 18 is sealed. The electrodes 20, 22 are mounted on the respective lead-in conductors 16, 18. The electrodes 20, 22 comprise coiled tungsten. A thorium sliver or alkaline-earth metal oxide mixture may be included between the wound tungsten and the supporting lead-in conductor. The lead-ins are externally connected to a conventional ballasted power supply 24.

In one embodiment the arc-tube is about 3 inches long, about three-eighths inches in outside diameter, with a 40 mil wall thickness. The envelope is sapphire. The arc-length between the electrodes is about 2.75 inches. The device is dosed with 15 milligrams of mercury, 2 milligrams of potassium, and tipped off with argon at 25 torrs and sealed.

Figure 2:
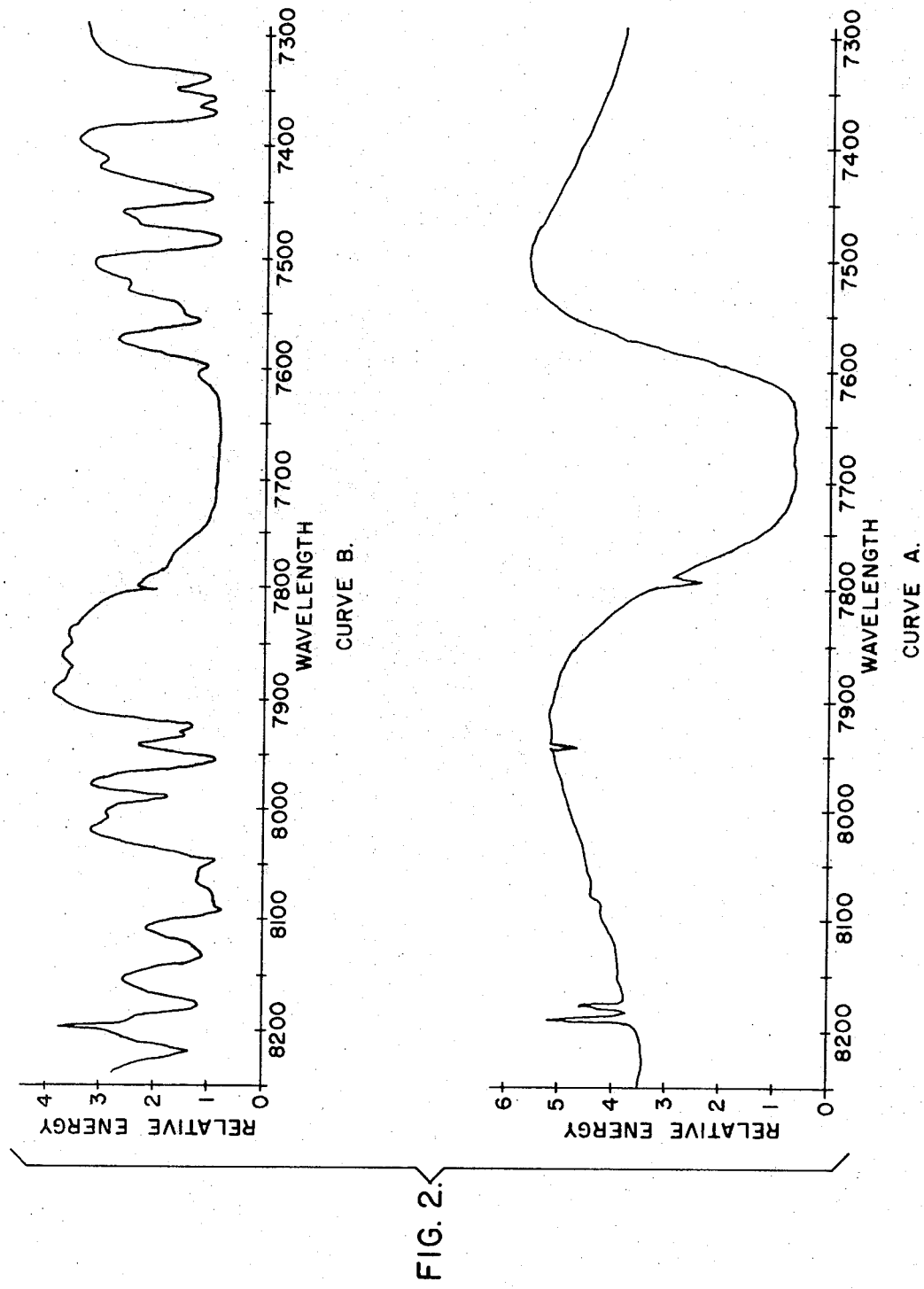
FIG. 2 comprises curve A which is a plot of the relative radiative output of a mercury-potassium discharge device of the present invention. The relative energy is measured along the ordinate axis against the wavelength of output measured in Angstroms. Curve B is a plot of the output of the same device measured by the same spectrograph focused through a neodymium-doped yttrium-aluminum-garnet filter.
Figure 3:
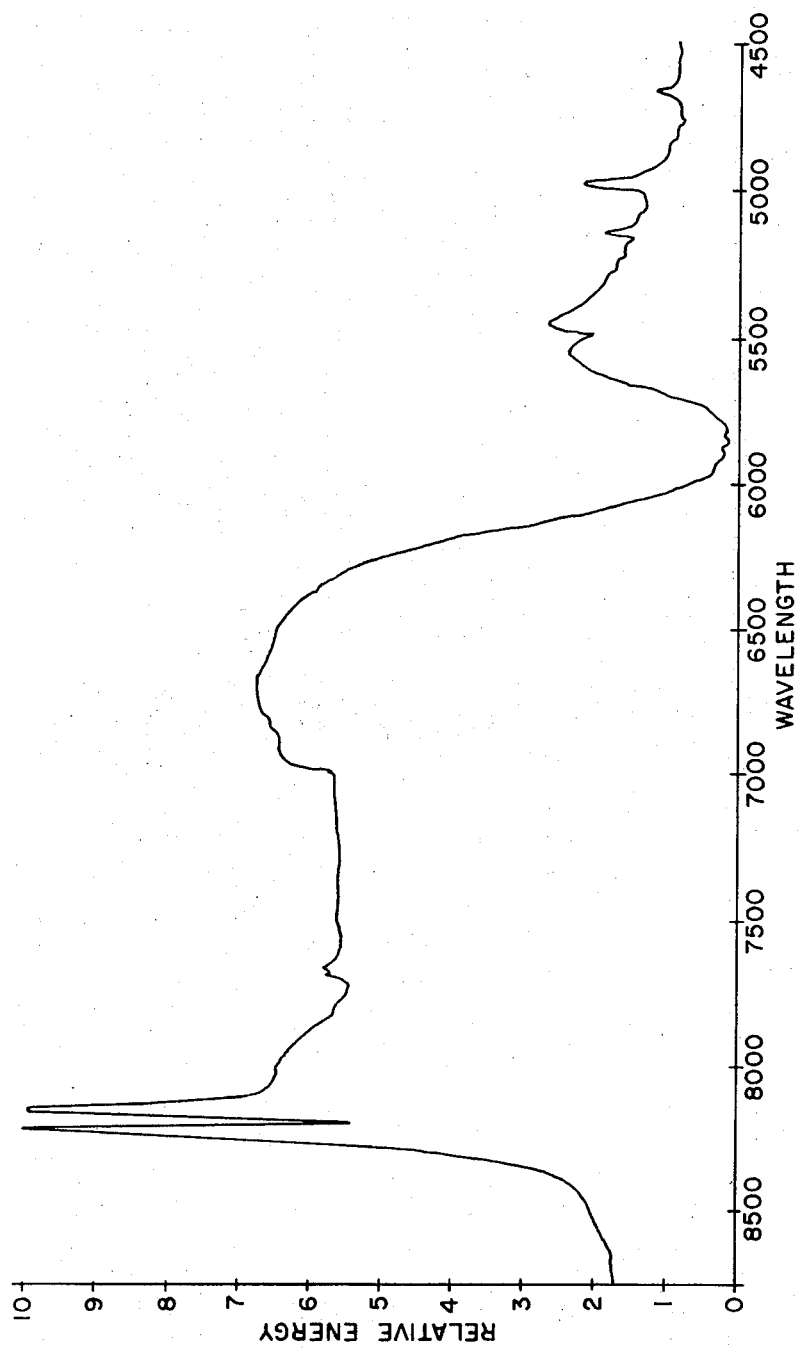
FIG. 3 is a plot of the relative radiative output of a mercury-sodium discharge device of the present invention. The relative energy is measured along the ordinate axis against the wavelength of the output measured in Angstroms.

This device when operated at for example about 530 watts at 4 amps rms. exhibits emission as shown in FIG. 2. The 7664 and 7698 Angstrom potassium resonance lines as shown in Curve A are seen to be strongly reversed and the emitted radiation is broadened as a continuum in the portions of the spectrum adjacent the resonance lines, both in the short-wavelength and long-wavelength wings adjacent to the resonance lines. FIG. 2 also shows in Curve B the emitted radiation measured by a spectrograph through a neodymium activated yttrium-aluminum-garnet filter. It is clearly seen that this laser material has an absorption characteristic which closely matches the emission characteristics of the device described above particularly in the ranges of 7300 to 7600 Angstroms and 7900 to 8200 Angstroms.

In another embodiment of the invention, the arc-tube described in FIG. 1 is filled with 7.5 mgs. of sodium and 15 mgs. of mercury and tipped off with argon at a partial pressure at room temperature of about 25 torrs. of mercury. This device when operated at about 290 volts AC, 4.8 amps rms, from energy source 24 exhibits an emission spectrum in which the sodium resonance lines at 5890—5896 Angstroms are strongly reversed and the radiation emitted is shifted to higher wavelengths.

In the foregoing specific examples the gram-atom ratio of the mercury to sodium or potassium can be varied from about 0.1 to 5. For a device containing potassium the partial pressure of potassium during operation is preferably from 10 to 200 torrs, and preferably 100 torrs to achieve the resonance reversal and emission shift to the desired range of wavelengths.

For a mercury-potassium arc-discharge device the preferred gram-atom ratio of mercury to potassium is about 1.5 and the preferred partial pressure of potassium during operation is about 100 torrs.

The aforementioned sodium-mercury device described has the preferred gram-atom ratio of mercury to sodium of about 0.23. The sodium partial pressure during operation is to be from about 400 torrs to about three atmospheres, and preferably at about two atmospheres.

In the foregoing specific examples, the mercury and sodium or potassium forms an amalgam in the device. The partial pressure of these constituents during operation at a particular power input is dependent upon the ratio of the constituents as well as the cool spot temperature of the device. The cool spot temperature is in turn determined for a specific filling by the envelope configuration and power input.

The inert fill gas preferred is argon at about 25 torrs; however, the particular inert gas and pressure are not critical and can be varied.

The effect of the mercury-alkali amalgam is to allow a high power input at moderate current levels for the device than would be possible for a simple alkali metal discharge device. The mercury also results in the device exhibiting increased broadening of the emitted radiation in the long-wavelength wing extending from the self-reversed alkali-metal resonance line which makes the devices particularly attractive for laser pumping applications. The emitted energy is effectively concentrated in the broadened long-wavelength wing extending from the resonance line to about 8193 A. in the case of the sodium-mercury device, and for the potassium-mercury devices there is good emission extending from the 7664-7698 resonance lines through the broadened long-wavelength wing extending through the near-infra-red to about 8500 A.

It has been discovered that in order to achieve the alkali-metal partial pressure desired the sodium or potassium must be supplied in an amount of at least $1 \times 10^{-5}$ gram per cc of arc tube volume.

Figure 4:
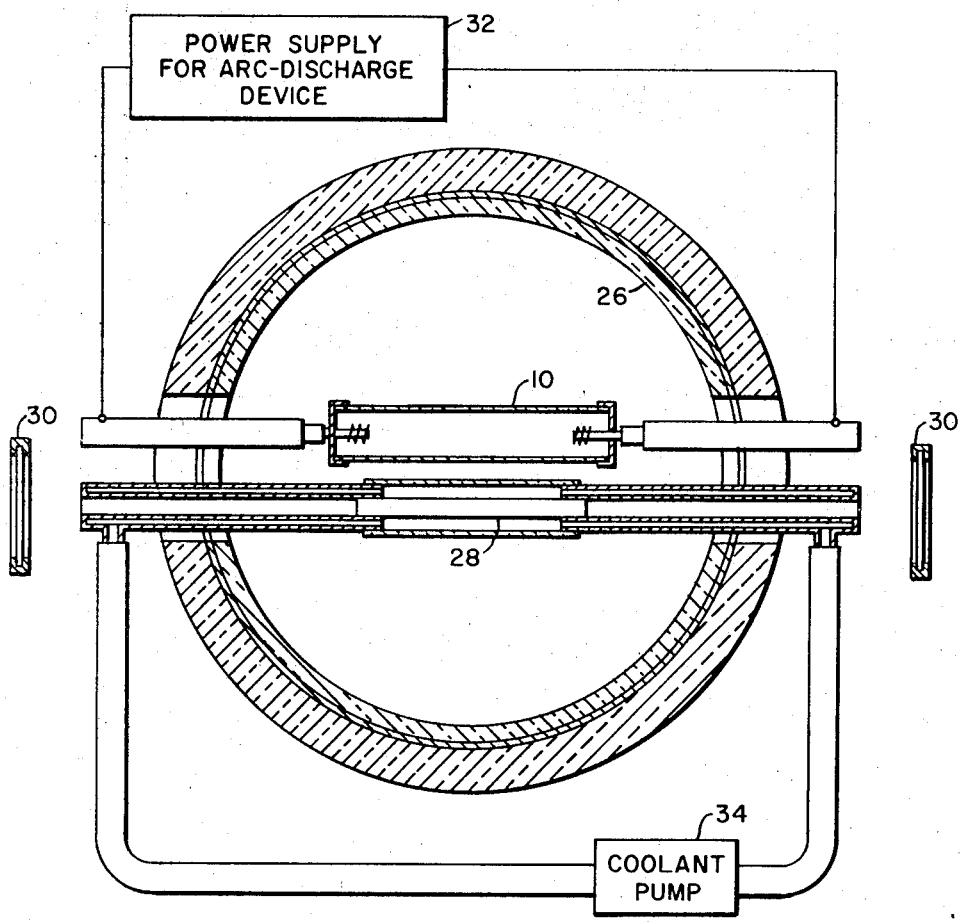
FIG. 4 is a view partially in section of a laser system incorporating the arc-discharge device of the present invention as seen in FIG. 1, optically coupled to pump the laser system.

The above described arc-discharge devices are easily incorporated into a laser assembly as shown in FIG. 4 in which the laser element is a rod of neodymium doped yttrium-aluminum-garnet. Such an efficient laser system is described in U.S. application Ser. No. 625,855 filed Mar. 24, 1967 by Charles H. Church and Irving Liberman and owned by the assignee. The embodiment shown in FIG. 4 utilizes a spherical reflector 26 to efficiently optically couple the radiation produced by arc-discharge device 10 of the present invention to the laser rod 28. It is preferred that the size of the discharge device closely matches the size of the laser rod.

The spherical reflector described therein has a center of curvature about which the arc-discharge device and the laser rod are disposed to substantially focus the radiation from the near infrared emitting arc-discharge device upon the laser rod. The details of the laser assembly are more particularly set forth in the aforementioned copending application. The assembly includes end mirrors 30, a conventional power supply 32 for the arc-discharge device, and a cooling system 34 which keeps the laser rod at the desired temperature.

The laser system described in FIG. 4 utilizing the arc-discharge devices of the present invention has achieved superior pumping efficiencies which make continuous operation feasible at relatively high power levels.

The neodymium-doped yttrium-aluminum-garnet laser rod has an infrared absorption characteristic which makes pumping with the infrared emitting arc discharge devices of the present invention an efficient operation.

It will be recognized that there have been provided arc-discharge devices that efficiently emit radiation in the infrared region of the spectra and that such devices can be used to efficiently optically pump laser material.

While the invention has been described with respect to lamps having specific dimensions and operating requirements it is to be understood that the invention is not to be limited thereto or thereby.

I claim:

1. An arc-discharge device comprising:
   a radiation-transmitting envelope of predetermined dimensions and having electrodes operatively disposed therein and adapted to be connected to a source of electric energy;
   a discharge-sustaining filling contained within said envelope, said discharge-sustaining filling consisting essentially of a small charge of inert gas, a predetermined amount of mercury, and a charge of potassium;
   said potassium filling being present in an amount of at least $1 \times 10^{-5}$ gram per cc of envelope volume and the gram-atom ratio of said mercury to said potassium being from 0.1 to 5;
   said device adapted to be operated with a predetermined power input to produce a predetermined partial pressure of potassium during operation, and the potassium partial pressure during stable operation being from 10 torrs to 200 torrs;
   whereby the potassium resonance lines are self-reversed and the radiation is broadened substantially as a continuum in the portion of the spectrum extending from the respective metal resonance line.

2. The device as specified in claim 1, wherein the gram-atom ratio of mercury to potassium is preferably about 1.5, and the operative partial pressure of potassium is about 100 torr.

3. The combination of the arc-discharge device specified in claim 1 optically coupled to a laser system which comprises a lasering material which is efficiently pumped by the radiative output of said arc-discharge device.

4. The combination as specified in claim 3, wherein said lasering material is neodymium-doped yttrium-aluminum-garnet.